Figure 1:
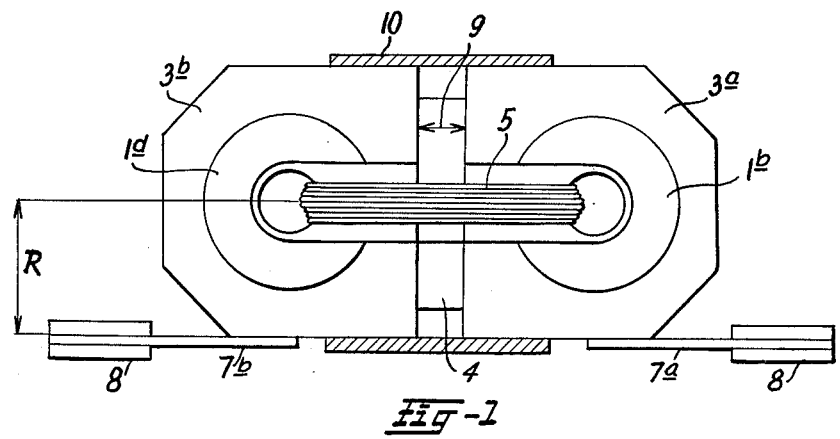

June 4, 1963    B. DUBSKY ETAL    3,092,795
FOURFOLD ELECTROMAGNETIC TENSOMETER WITH ADJUSTABLE PRESTRESSING
Filed Aug. 22, 1960    2 Sheets-Sheet 1

INVENTORS
Bořivoj Dubský & Oldřich
BY            Straka

Richard Ernst
ag't

United States Patent Office 3,092,795
Patented June 4, 1963

3,092,795
FOURFOLD ELECTROMAGNETIC TENSOMETER WITH ADJUSTABLE PRESTRESSING
Borivoj Dubsky, Prague, and Oldrich Straka, Rumburk, Czechoslovakia, assignors to Vyzkumny a zkusebni letecky ustav, Prague, Czechoslovakia
Filed Aug. 22, 1960, Ser. No. 50,904
Claims priority, application Czechoslovakia Aug. 26, 1959
6 Claims. (Cl. 336—30)

The present invention relates to an electromagnetic tensometer provided with adjustable prestressing means and being designed for measuring insignificant length changes caused e.g. by tension acting in a given material, by temperature changes etc. It is an object of the invention to provide a tensometer in which it is possible to set the prestressing in an arbitrary way once the tensometer has been fixed upon the member in which tension is to be measured, and thus to make use of the measuring capacity of the tensometer to its full extent.

There are a great many tensometers of different structural arrangements, the electromagnetic ones being represented by several types. Among them there is the double electromagnetic tensometer which, in comparison with other similar types, presents several advantages, but at the same time has some undesired charactristics. In this type of tensometer, the electromagnetic force is generated in two parallel torsional tubes of ferromagnetic material having an exciting winding passing therethrough. The ends of the two tubes are mutually rigidly interconnected, whereas the centers of the tubes are in the form of collars which are connected to a material to be measured and each tube has pickup coils extending therearound at the opposite sides of its central collar. The main drawback of the above arrangement consists in the fact that, once the tensometer had been fixed to the measured material, a prestressing of certain value cannot be prevented, or the prestressing itself cannot be set at a value permitting the tensometer to operate in the linear portion of its response curve and to be utilized to its full extent. A second drawback of the described arrangement is the difficulty encountered in properly sealing the tensometer so as to permit its safe application when immersed in water or placed in explosive surroundings and the like. A further drawback of the described existing tensometer is its sensitivity to foreign non-homogenous magnetic fields.

The electromagnetic tensometer according to the present invention comprises a device which transforms the deformation (strain) of the measured material into the twisting of four tubular ferromagnetic torsional bodies which are disposed in a magnetic field established by an exciting circuit and thereby induce in the pick-up circuit an electromotive force proportional to the value of the measured strain of material. The arrangement of the four torsional bodies in this device enables the sealing of the whole pick-up or tensometer and the setting of the degree of prestressing. This adjustment of the prestressing is made possible by arranging the four tubular torsional bodies in pairs which are disposed side-by-side, with the torsional bodies of each pair in end-to-end relation. The outer ends of each pair of torsional bodies are fixed to a related surrounding casing, while the inner or adjacent ends are fixed to a common connecting member extending between both pairs of torsional bodies and having means for torsionally prestressing the pairs of torsional bodies.

Figure 3:
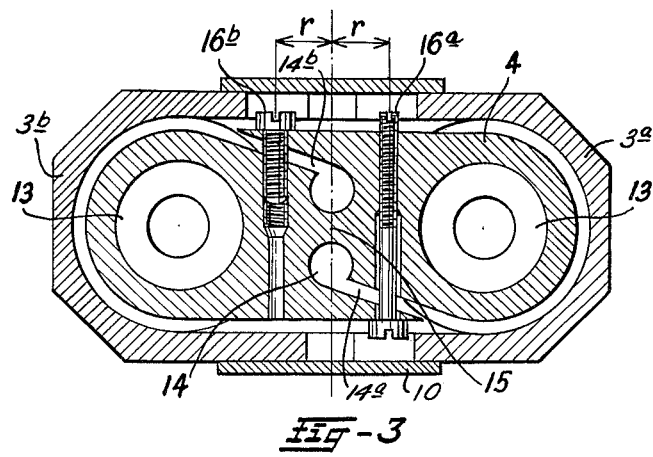
Figure 2:
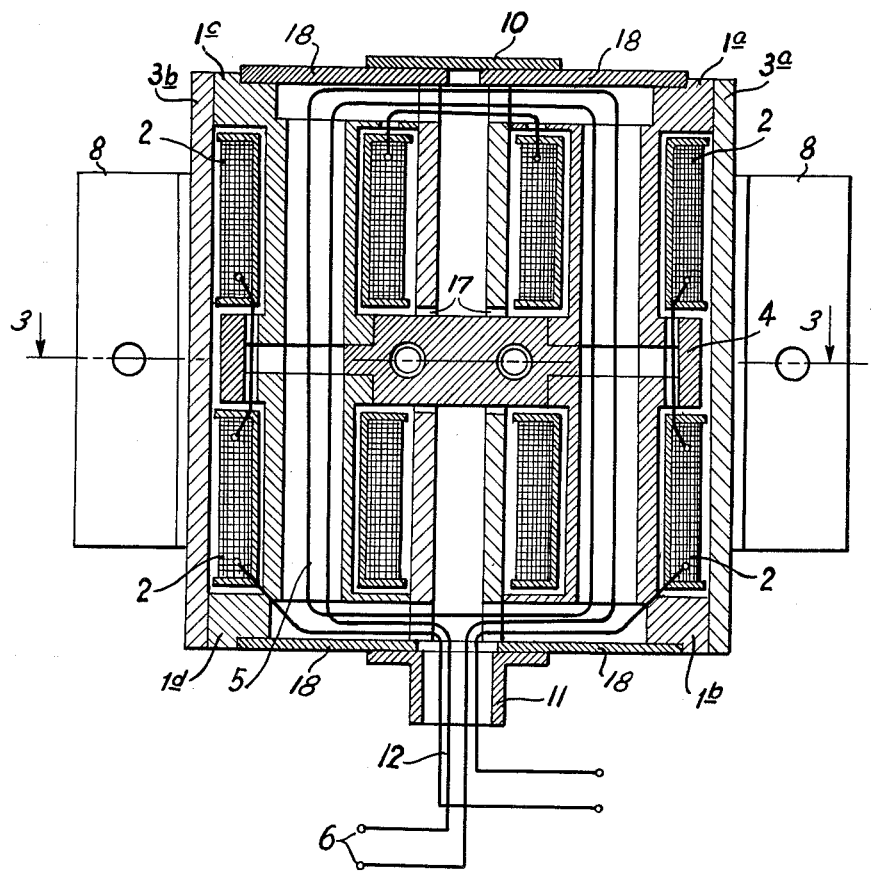

The lay-out of the tensometer embodying the present invention may be arranged in several ways depending upon the mode of application and upon the desired dimensions of the device. One embodiment is shown, by way of example, in the accompanying drawing, wherein: FIG. 1 is a front elevation view, FIG. 2 is a sectional plan view, and FIG. 3 is a detail sectional view taken along the line 3—3 on FIG. 2, and showing the bush or common connecting member provided with set screws adjusting the initial prestressing.

The electromagnetic tensometer embodying the present invention comprises four tubular torsional bodies $1a$, $1b$, $1c$ and $1d$ each carrying a pick-up coil 2. The pair of torsional bodies $1a$ and $1b$ are arranged end-to-end within a surrounding casing $3a$, and the other pair of torsional bodies $1c$ and $1d$ are also arranged end-to-end within a surrounding casing $3b$ which is parallel with, and spaced laterally from the casing $3a$.

The outer ends of torsional bodies $1a$ and $1b$ are fixed to the related casing $3a$, while the outer ends of torsional bodies $1c$ and $1d$ are similarly fixed to the casing $3b$. The inner or adjacent ends of the torsional bodies $1a$ and $1b$, and of the torsional bodies $1c$ and $1d$, are fixedly secured in recesses 13 (FIG. 3) of a bush or common connecting member 4 which extends laterally between the two pairs of torsional bodies through openings 17 in the confronting sides of casings $3a$ and $3b$ (FIG. 2).

A toroidal exciting winding 5 extends axially through the tubular torsional bodies $1a$ and $1b$ and through the tubular torsional bodies $1c$ and $1d$. Leads 12 extend from the pick-up coils 2 and the exciting winding 5 to a suitable connector 6 at the exterior of the tensometer for connection to a pick-up circuit and to an exciting circuit, respectively.

On the casings $3a$ and $3b$ there are spotwelded, fusion-welded or brazed flexible plates and boards $7a$ and $7b$ to which the feet 8 are fixed in the same manner as mentioned above. The ends of the casing $3a$ and $3b$ are closed by end plates 18 (FIG. 2). The space 9 formed between the casings $3a$ and $3b$, is covered all around by the gasket 10 which is common with a sealed bushing 11 through which the leads 12 extend in a fluid-tight manner.

As shown in FIG. 3, the bush or common connecting member 4 is formed with oppositely inclined slots $14a$ and $14b$ extending toward the center of member 4 from the bottom and top, respectively, of the opposite ends of member 4, with the inner ends of slots $14a$ and $14b$ being spaced apart to define a necked-down portion 15 therebetween at the center of the connecting member. Further, two set screws $16a$ and $16b$ extend across the slots $14a$ and $14b$, respectively, each at a distance $r$ from the center of the member 4. It will be apparent that manipulation of the screws $16a$ and $16b$ is effective to widen or narrow the slots $14a$ and $14b$ and thereby flex the end portions of member 4 about the necked-down central portion 15 for twisting the inner ends of torsional bodies $1a$, $1b$, $1c$ and $1d$ relative to the outer ends secured to casings $3a$ and $3b$. The tensometer may also be provided with other known measuring means e.g. with points applied to casings $3a$ and $3b$ instead of the boards 7 and the feet 8.

In employing the electromagnetic tensometer according to the present invention for measuring tension or temperature changes, the feet 8 are bonded, brazed or welded to the material to be measured, while the screws $16a$ and $16b$ are approximately at their center positions or are both loosened; depending upon the manner of application. Once the bonding material is sufficiently hard, or once the temperature has been equalised in the case where the tensometer feet 8 have been previously brazed or welded to the material to be measured, the screws $16a$ and $16b$ are set according to the selected tensometer prestressing, usually at zero value. A slight movement caused by elongation or shortening of the material to be measured is transmitted via boards $7a$ and $7b$ and casings $3a$ and $3b$ to the tubular bodies $1a$, $1b$, $1c$ and $1d$ in which a torsional stress is developed simultaneously with a bending and a shear phenomena. An electromagnetic field, which is initially in the shape of concentric circles, is generated in the tubular torsional bodies by means of an exciting current passing through the toroidal exciting winding 5, and that electromagnetic field is deformed by the effect of the torsional stress so as to generate a longitudinal component proportional to the value of torque or elongation of the material and an electromotive force which may be measured, e.g. by means of a voltmeter, is induced in the pick-up coils 2 which, as shown, are arranged orthogonally with respect to the exciting winding 5. The device for setting the prestressing to the selected value represented by the connecting member 4 and the screws 16a and 16b tends to vary substantially the mutual distance between both feet 8. Since the tensometer is rigidly fixed to the material to be measured, a prestressing having a certain value takes place, which may be measured when the tensometer is connected to a convenient measuring means preferably to a voltmeter or oscilloscope. In this way an arbitrary value of prestressing may be set according to need.

The electromagnetic tensometer according to the present invention may be employed wherever tension or temperature changes are to be measured, even where the hitherto applied tensometers could not have been utilized, for example, when immersed in water or placed in proximity of strong magnetic fields. Further, widening of strong magnetic fields. Further, widening of the measuring range and a consequent accuracy increase result from the possibility of adjusting the prestressing value. By reason of its robust structure and to its high sensitivity, the electromagnetic tensometer embodying the present invention can be employed even under the most adverse operating conditions.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What we claim is:

1. An electromagnetic tensometer comprising first and second pairs of tubular bodies of ferromagnetic material, the tubular bodies of each of said pairs being arranged in end-to-end relation with said first pair being parallel to and spaced from said second pair, first and second spaced apart casings extending around said first and second pairs of tubular bodies, respectively, each of said casings being fixedly secured to the outer ends of the related pair of tubular bodies, a common connecting member extending between said pairs of tubular bodies and having opposite end portions fixedly secured to the adjacent inner ends of said first and second pairs of tubular bodies, respectively, so that said tubular bodies are torsionally stressed by relative turning of said casings in opposite directions, orthogonally arranged exciting and pick-up windings extending through and around said tubular bodies so that an exciting current flowing through said exciting winding establishes a magnetic field which has a component at right angles to the turns of said pick-up windings only in response to torsional stressing of said tubular bodies, thereby to induce a voltage in said pick-up windings which is proportional to said torsional stressing, and means extending from said first and second casings for engagement with a test piece at spaced apart locations along the latter and operative to oppositely turn said first and second casings and thereby torsionally stress said bodies in response to changes in the distance along the test piece between said locations.

2. An electromagnetic tensometer as in claim 1; wherein said pick-up windings extend around said tubular bodies and said exciting winding is toroidal and extends axially through all of said tubular bodies.

3. An electromagnetic tensometer as in claim 1; wherein said means extending from the first and second casings for engagement with a test piece includes flexible plates extending tangentially from said casings in substantially the same plane and in opposed directions, and feet at the free ends of said plates adapted to be secured to the test piece.

4. An electromagnetic tensometer as in claim 1; wherein said common connecting member has a central portion of reduced cross-sectional area to permit relative angular displacement of said end portions of the common connecting member and hence torsional prestressing of said tubular bodies; and further comprising adjustable means operative to effect said relative angular displacement of said end portions of the connecting member for varying said torsional prestressing of the tubular bodies.

5. An electromagnetic tensometer as in claim 4; wherein said connecting member has oppositely inclined slots therein defining said central portion of reduced cross-sectional area between said slots, and said adjustable means for effecting relative angular displacement of the end portions of said connecting member includes set screws extending across said slots.

6. An electromagnetic tensometer as in claim 1; further comprising covers closing the ends of said casings, and a sealing gasket extending around and closing the space between said casings and having a sealed outlet for said pick-up and exciting windings.

References Cited in the file of this patent

UNITED STATES PATENTS 2,412,345     Lindenblad _____ Dec. 10, 1946